Sept. 8, 1970     M. A. LEVINSTEIN     3,526,953
METHOD FOR MAKING LIGHTWEIGHT METALLIC STRUCTURE
Original Filed Jan. 3, 1967
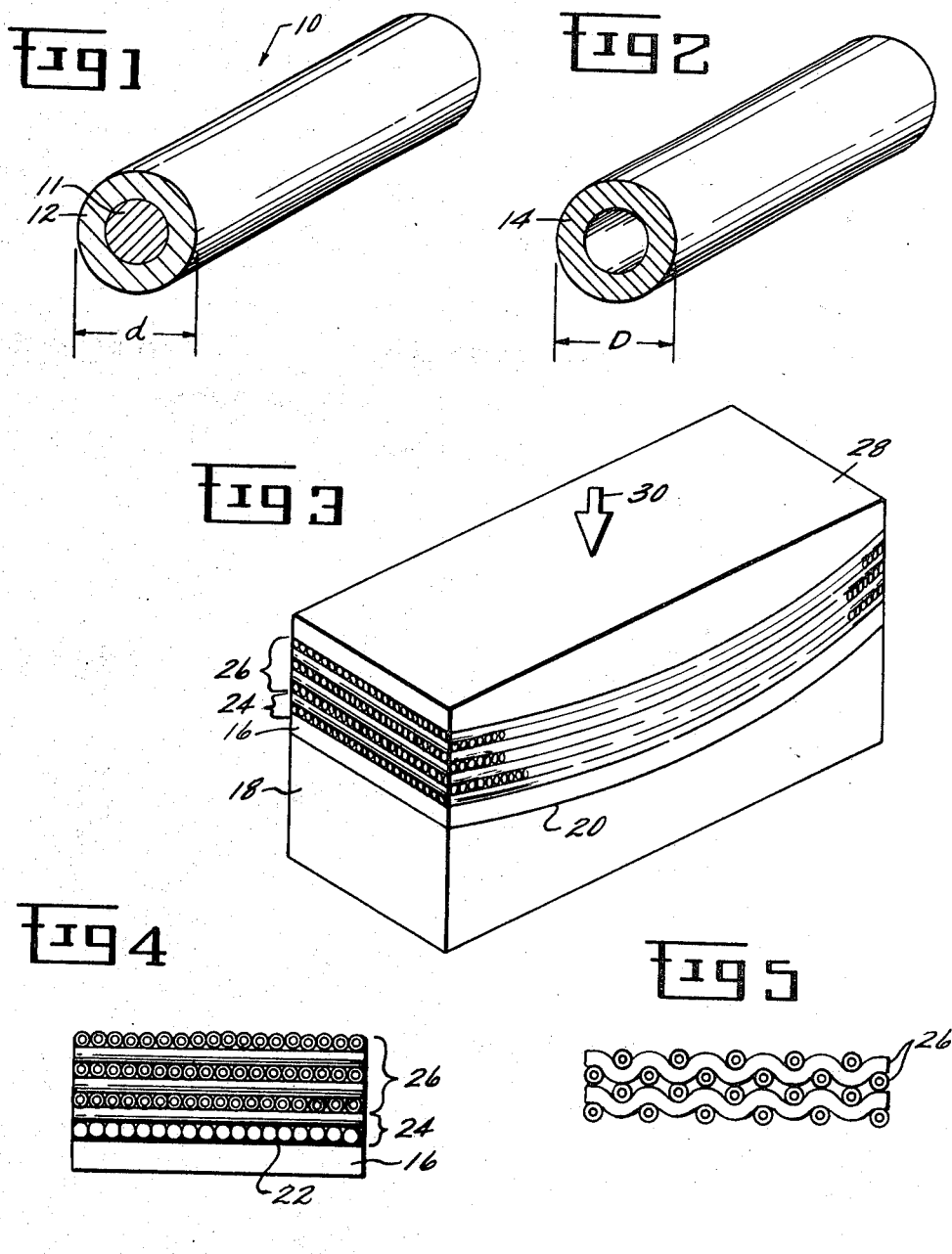
INVENTOR.
MOSES A. LEVINSTEIN
BY
*Lee Sachs*
ATTORNEY

United States Patent Office 3,526,953
Patented Sept. 8, 1970

3,526,953
METHOD FOR MAKING LIGHTWEIGHT METALLIC STRUCTURE
Moses A. Levinstein, Cincinnati, Ohio, assignor to General Electric Company, a corporation of New York
Original application Jan. 3, 1967, Ser. No. 606,943, now Patent No. 3,489,534. Divided and this application June 5, 1969, Ser. No. 847,765
Int. Cl. B23k 31/02
U.S. Cl. 29—471.3                    7 Claims

ABSTRACT OF THE DISCLOSURE

A method wherein a plurality of bonded hollow tube like members are provided by juxtaposing a plurality of solid wire like coated core members and heating to diffuse substantially all of the core material into the coating material while also bonding each of the coatings together.

---

This is a divisional application of application Ser. No. 606,943, filed Jan. 3, 1967, now Pat. No. 3,489,534, and assigned to the assignee of the present invention.

This invention relates to lightweight metallic structures and, more particularly to such a structure including members such as filaments, strands or wires of metal bonded together.

Lightweight mesh, fabric or metal wool structures, hereafter called mesh, employing strands, wire or filaments, hereafter called wires, held to or bonded with one another, alone or as a support for other members, use such wires in solid form in uniform or random arrangements. Such wires can be bonded together by welding, brazing and the like.

One use for such a structure is as a gas seal held between successive stages of an axial flow turbine. In such an application layers of mesh bonded to holding members, are located opposite the tips of blading members. In some applications filler materials are disposed between wires. Because of the variety of metals available for the wires and variety of available filler or bonding material, abradability, temperature resistance, oxidation resistance and the like can be selected for the mesh. However, because commercially available fine wires are solid, the density of the material is greater than that which would be most desirable, particularly for use in an aircraft gas turbine where weight is an important factor.

It is the principal object of the present invention to provide an improved lightweight metallic structure including layers of fine hollow wires or mesh to decrease the density of the structure.

Another object is to provide a method for making such an improved structure.

Another object is to provide an improved, lightweight gas turbine abradable shroud.

These and other objects and advantages will be more clearly understood from the following detailed description, examples and the drawing.

In the drawing:

FIG. 1 is a sectional isometric view of a wire having a solid metallic core and a continuous metallic shell prior to processing;

FIG. 2 is a sectional isometric view of the wire of FIG. 1 after processing;

FIG. 3 is a partially sectional isometric view of a shroud including the structure of the present invention;

FIG. 4 is a more detailed sectional view of a shroud of the present invention including stacked unwoven wires; and FIG. 5 is a sectional view of the upper portion of the shroud as shown in FIG. 4 with wires in the form of a mesh.

In order to attain and fulfill the above objects, a lightweight metallic structure is made by providing a metallic wire or mesh core of a first metal and then coating it, such as by electro or vapor deposition, with a shell of a second metal to produce a composite wire or mesh. The crystal relationship and relative diffusion rates between the core metal and the shell metal is such that the core metal will diffuse preferentially into the shell metal to produce a wire or mesh having a hollow interior bounded by the shell metal. This will occur when the composite wire or mesh is heated at a temperature below the melting point of the shell metal and in the absence of a shell-crushing pressure. Metals which can be used in this manner for a core material include aluminum, magnesium and their alloys. Metals which can be used as the coating or shell material include iron, nickel, cobalt and their alloys.

According to one form of the present invention, after a core wire is coated, the composite wire thus formed can be arranged into a mesh or other desired configuration. A plurality of meshes or individual wires can be stacked beside or one upon the other or both to provide whatever thickness is desired. Then the composite members are held in intimate contact at various points along their surfaces and heated at that temperature sufficient to diffuse the core metal into the shell metal but below the melting point of the shell metal. The result is a lightweight porous structure comprising a plurality of wires or meshes bonded one to the other, each wire or mesh having a hollow core. If more rigidity, ductility, bonding or body is desired, solid wires or powdered filler material such as brazing alloys or both can be intermixed or interwoven with the composite wires or meshes.

Described in co-pending application Ser. No. 606,943, filed Jan. 3, 1967, now Pat. No. 3,489,534, assigned to the same assignee as this invention is a method for making hollow members which includes the making of hollow wires, meshes and tubes. It has been found that if, during heating to diffuse the core metal into the shell metal, a plurality of composite wires or meshes are maintained in contact under sufficient pressure to maintain the contact but not sufficient to cause collapse of walls of the hollow wires produced, the wires not only can be made hollow but also can be bonded into a more rigid structure.

Referring to the drawing, the isometric sectional view of FIG. 1 shows a composite wire 10 having a core 11 most conveniently and preferably of a metal of the group aluminum, magnesium and their alloys. Surrounding the core is a coating or shell 12 of a metal into which core 11 will diffuse upon heating to a temperature such as above the melting point of core 11. Most desirable shell metals for this purpose are metals of the group of iron, cobalt, nickel and their alloys.

After heat treatment according to the present invention, such as about an hour at 2000° F., core 11 of the composite wire 10 in FIG. 1 diffuses into shell 12 to form an alloy 14 as shown in FIG. 2. When such a metal as aluminum is used for the core and nickel for the shell, it has been found that original composite wire outside diameter $d$ in FIG. 1 increases to hollow wire outside diameter D in FIG. 2. If a plurality of stacked mesh including composite wires is contained in a fixed volume during heat treatment, such increase in diameter produces a slight pressure between the wires. This assists in bonding together during processing the plurality of composite wires. Therefore, a holding or confining structure in which the plurality of wires or meshes are placed can be shaped to provide a desired arrangement.

One such arrangement which can be made is shown in FIG. 3 during the practice of the method of this invention. A sectional view of the product is shown in FIG. 4. Referring to those two figures, a shroud backing member 16 of a stator portion of an axial flow turbine, for use opposite rotating blades, was placed on a fixture base 18 having a curved surface 20 adapted to receive the shroud member. A nickel base brazing alloy powder 22, in the form of a paste or slurry, was placed on the exposed surface of shroud member 16. Solid wires of a nickel base alloy 24, sometimes referred to as Nichrome alloy, were placed over the brazing alloy 22. In another example substantially pure nickel wire mesh was used.

Composite wires 26 made of 15–40 mil aluminum wire as the core with a 5–10 mil thick coating of nickel as the shell were then placed on the solid wires 24. By weight, this consisted of 20–27% Al and 73–80% Ni. As shown in FIG. 5, the wires can be partially or entirely woven together into a mesh. A top holding plate 28 was placed on the stacked wire-brazing alloy combination. In order to assure bonding of the various wires and brazing alloys together and to the shroud backing member 16, a slight holding pressure, represented by arrow 30, was applied to the stacked wires through holding plate 28. For example, this can be accomplished by clamping strips or other clamping means well known in the art. However, the pressure applied should be less than that which would cause collapse of the hollow wire during or after processing.

The clamped structure was then heated for one hour at about 2000° F. in argon to diffuse the aluminum core 11 into shell 12 to form a shell 14 of a nickel-aluminum alloy as shown in FIGS. 1 and 2. This produced hollow wires 26 of FIG. 4 or FIG. 5. At the same time, the heat treatment bonded wires 26 together and to wire mesh or structure 24 and also brazed solid wires 24 to shroud 16 to form the abradable shroud shown in FIG. 4.

In another specific example, 25 mil aluminum wires were first coated with 7.5 mils of nickel by electroplating. The nickel-aluminum alloy 14 in FIG. 2 was produced after diffusion of the aluminum wire into the nickel shell in an argon atmosphere furnace in which the temperature was increased over a period of about 2 hours from room temperature to 2000° F. The material was then held for ½ hour at 2000° F. after which it was slowly cooled over a period of about 1 hour. The relatively slow heat up period or rate is desirable to avoid rupture of the shell wall as a result of too rapid a diffusion and expansion. However, frequently in the manufacture of shrouds as described above, some incidence of shell wall rupture in the tubular structure can be tolerated; the density is not appreciably increased and the high porosity and void space through a very high percentage of the remainder of the tubes and structure provides the material with suitable abradability.

In one example, a 99% aluminum core in the form of a 120 x 120 mesh of 4 mil wire in a twill weave first was coated as a unit with 1.5 mils of nickel in an electroplating bath. Such coating by electroplating or vapor deposition can be accomplished readily with well known processes having sufficient throwing power to deposit nickel over virtually the entire exposed surface. By moving the electroplating holder from time to time during plating, a substantially completely coated composite structure can be produced. Then upon heating to diffuse the core into the shell, some thin walls or even ruptures may result at or near the points of contact between wires of the core mesh. However, as was mentioned above, this is not necessarily important in an abradable shroud of the type described above. In some cases, there are no breaks at such points of contact. If any breakthrough in the wall structure of the final hollow tubular member is to be specifically avoided, then the core wires should be coated individually prior to their being woven or grouped into a mesh, fabric, metal wool and the like.

It has been found that composite wires having a core consisting essentially of 5–35 weight percent of the composite wire are preferred for use in the present invention. Below about 5%, too small a void is created because of expansion of the wire during processing. A core greater than about 35 weight percent results in too thin a shell.

Although description of the present invention has included specific examples and embodiments, these are meant to be typical of the invention rather than any limitation. It is intended by the appended claims to cover the various modifications and variations of which the invention is capable within the knowledge of one skilled in the art.

What is claimed is:

1. An improved method for making a lightweight metallic structure comprising the steps of:
   providing a plurality of cores of a core metal, each core including at least one wire;
   coating each core with a shell metal to produce a composite member;
   the relative diffusion rate between the core metal and the shell metal being such that the core metal will diffuse preferentially into the shell metal at a temperature below the melting point of the shell metal;
   arranging a plurality of said composite members so that adjacent members contact one another to define a composite structure having a thickness of a plurality of said composite members;
   holding in contact the plurality of composite members with a force less than that which will cause collapse of the shell metal alone; and then
   heating the plurality of said composite members at a temperature sufficient to diffuse substantially all of the core metal into the shell metal and to bond the composite members together but lower than the melting point of the shell metal to produce a lightweight metallic structure containing a plurality of hollow shell members.

2. The method of claim 1 in which:
   the core metal is selected from the group consisting of aluminum, magnesium and their alloys and consists essentially of 5–35 weight percent of the composite member;
   the shell metal is selected from the group consisting of iron, nickel, cobalt and their alloys; and
   the plurality of composite members are heated at a temperature in the range of 1600–2200° F.

3. The method of claim 2 in which the core metal is aluminum and the shell metal is nickel.

4. The method of claim 1 in which solid wire members are arranged and held among the plurality of composite members to define the composite structure prior to heating.

5. The method of claim 1 for making a lightweight shroud including, in addition:
   providing a backing member;

applying a brazing alloy to a surface of the backing member; and then arranging and holding the plurality of composite members on the brazing alloy;

the temperature for heating the plurality of composite members being sufficient to braze the composite members to the backing strip as well as to diffuse the core metal into the shell metal.

6. The method of claim 5 in which the core metal is aluminum, the shell metal is nickel and the brazing alloy is a nickel base brazing alloy.

7. The method of claim 5 in which solid wire members are arranged and held among the composite members prior to heating.

References Cited

UNITED STATES PATENTS

| 1,618,142 | 2/1927 | Wheelwright | 29—475 |
|---|---|---|---|
| 2,619,438 | 11/1952 | Varian | 29—471.1 XR |
| 2,930,117 | 3/1960 | Wilson | 29—498 XR |
| 2,974,404 | 3/1961 | Humenik et al. | 29—471.1 XR |
| 3,037,275 | 6/1962 | Schmitz | 29—471.1 X |
| 3,091,026 | 5/1963 | Hill et al. | 29—498 XR |

JOHN F. CAMPBELL, Primary Examiner

R. B. LAZARUS, Assistant Examiner

U.S. Cl. X.R.

29—472.3, 475, 498, 502, 504